United States Patent [19]
Aoki et al.

[11] Patent Number: 5,665,023
[45] Date of Patent: Sep. 9, 1997

[54] FAILSAFE CONTROL APPARATUS FOR BELT-TYPE CONTINUOUSLY VARIABLE TRANSMISSION

[75] Inventors: Takashi Aoki, Fujimi; Keiichi Hanyu, Iruma-gun; Kaoru Kajikawa, Kokubunji; Junji Urano, Sayama, all of Japan

[73] Assignee: Honda Giken Kogyo Kabushiki Kaisha, Tokyo, Japan

[21] Appl. No.: 227,653

[22] Filed: Apr. 14, 1994

[30] Foreign Application Priority Data

Apr. 11, 1993 [JP] Japan ............... 5-117856
Jul. 16, 1993 [JP] Japan ............... 5-199050

[51] Int. Cl.⁶ .......... B60K 41/12; F16H 59/00; F16H 61/00
[52] U.S. Cl. .............. 477/48; 477/906; 424/28
[58] Field of Search ............. 477/46, 48, 49, 477/906; 474/28

[56] References Cited

U.S. PATENT DOCUMENTS

| | | | |
|---|---|---|---|
| 4,403,975 | 9/1983 | Rattunde | 474/18 |
| 4,475,416 | 10/1984 | Underwood | 477/49 |
| 4,515,040 | 5/1985 | Takeuchi et al. | 477/47 |
| 4,534,243 | 8/1985 | Yokoyama et al. | 477/46 |
| 4,669,336 | 6/1987 | Okada et al. | 477/49 |
| 4,716,791 | 1/1988 | Ohzono et al. | 41/12 |
| 4,857,034 | 8/1989 | Kouno et al. | 474/28 |
| 5,176,579 | 1/1993 | Ohsono et al. | 474/1 |
| 5,183,439 | 2/1993 | Yumoto et al. | 474/28 |
| 5,427,579 | 6/1995 | Kanehara et al. | 474/28 |

FOREIGN PATENT DOCUMENTS

| | | |
|---|---|---|
| 0194821 | 9/1986 | European Pat. Off. . |
| 0234541 | 9/1987 | European Pat. Off. . |
| 0324928 | 7/1989 | European Pat. Off. . |
| 0498210 | 8/1992 | European Pat. Off. . |
| 61-206862 | 9/1986 | Japan . |
| 63-215437 | 9/1988 | Japan . |
| 4-243634 | 8/1992 | Japan . |
| 2260379 | 4/1993 | United Kingdom . |

OTHER PUBLICATIONS

English language Abstracts of above listed Japanese publications.
European Search Report.

Primary Examiner—Khoi Q. Ta
Attorney, Agent, or Firm—Lyon & Lyon LLP

[57] ABSTRACT

A control apparatus for a belt-type continuously variable transmission that has a drive pulley, a driven pulley, a V-belt trained around the drive and driven pulleys, a drive cylinder for varying the pulley width of the drive pulley, and a driven cylinder for varying the pulley width the said driven pulley. A pressure regulator valve produces pulley control pressures supplied to the drive and driven cylinders and a shift valve distributes the pulley control pressures to the drive and driven cylinders for varying the widths of the drive and driven pulleys for speed ratio control. An electric shift control normally controls the shift valve by electric power supplied to solenoid valves but the electric shift control causes the pressures in both the drive cylinder and said driven cylinder to be equal when the electric power is lost.

21 Claims, 8 Drawing Sheets

SHIFT CONTROL PRESSURE (Ps)

ELECTRIC CURRENT (A)

FAILSAFE CONTROL APPARATUS FOR BELT-TYPE CONTINUOUSLY VARIABLE TRANSMISSION

BACKGROUND OF THE INVENTION

1. Field of the Invention

The present invention relates to a control apparatus for controlling the speed ratio in a belt-type continuously variable transmission. More particularly, it relates to a control apparatus for electrically controlling the speed ratio.

2. Relating Prior Arts

Belt-type continuously variable transmissions are previously well-known and have been put to practical use. It comprises, for example, drive and driven pulleys each having a variable pulley width and a metallic V-belt trained around the drive and driven pulleys.

In the belt-type continuously variable transmission, the speed ratio (or gear ratio) is controlled by controlling the pulley widths of the drive and driven pulleys. The drive and driven pulleys respectively have drive and driven hydraulic cylinders for applying thrust forces to the pulleys, which forces are produced by a hydraulic pressure supplied to the cylinders. The control of the thrust forces to the respective cylinders allows varying the diameters of circles around which the V-belt is trained on the pulleys to control the speed ratio of the transmission. The control of the thrust forces also allows a tension control of the V-belt. One example of the speed ratio control apparatus for a belt-type continuously variable transmission is disclosed in Japanese Laid-open Patent Publication No. S61-206862.

Such a belt-type continuously variable transmission as described above can be mounted on an automobile. In the transmission mounted on an automobile, the hydraulic pressure supplied to the hydraulic cylinder to produce the thrust force is often controlled electrically. The hydraulic pressure is regulated by solenoid valves or solenoid actuators which are operationally controlled based on electric signals corresponding to an engine throttle opening and an engine speed. One example of such a control apparatus is disclosed in Japanese Laid-open Patent Publication No. S63-215437.

In a control apparatus in which the hydraulic pressure to produce the thrust force is electrically controlled, any electric trouble may deteriorate the controllability of speed ratio in the transmission. The control apparatus disclosed in Japanese Laid-open Patent Publication No. H4-243634 has means to enable a supplemental speed ratio control under an electric failure condition. The control apparatus has at least two parallel hydraulic control passages to supply a pulley width control pressure to the drive and driven cylinders. One of the control passage is used under normal conditions and the other control passage is used when any electric failure occurs.

In the control apparatus, control valves are needed in parallel in both of the control passages and the construction thereof tends to become complicated. Further, since many valves are disposed in the control passage through which a relatively high hydraulic pressure is supplied, the amount of leakage may easily increase. When the leakage is increased, a bigger hydraulic pump is needed to supply more oil. Since the bigger pump needs more drive power, the fuel economy of the engine may be deteriorated.

SUMMARY OF THE INVENTION

It is therefore an object of the invention to provide a control apparatus for a belt-type continuously variable transmission with a minimal number of control valves so as to make it simple in construction.

It is an another object of the invention to provide a control apparatus having a minimal number of control valves which are disposed in a high pressure hydraulic passage.

It is a further object of the invention to provide a control apparatus for a belt-type continuously variable transmission having a fail-safe system so as to ensure a minimum degree of control of the transmission speed ratio even if an electric failure occurs.

In order to achieve the objects, the control apparatus for a belt-type continuously variable transmission comprises a pressure regulator valve for producing a pulley control pressure to be supplied to drive and driven cylinders, a shift valve for distributing the pulley control pressure to the drive and driven cylinders to regulate drive and driven cylinder pressures in the drive and driven cylinders for a speed ratio control, electric shift control means for operationally controlling the shift valve by means of electric power, and means for allowing the electric shift control means to supply a common shift control pressure to both the drive and driven cylinders when the electric power supply is lost.

In the control apparatus, under a normal condition (a condition during which electric power is normally supplied), the shift valve is operationally controlled by the electric shift control means. When the electric power supply is lost (when an electric failure occurs), the common pressure is supplied to make the pressures in both the drive and driven cylinders equal with each other.

When the pressures in the drive and driven cylinders becomes equal with each other, it is generally considered that the diameters of circles around which the V-belt is trained on the drive and driven pulleys also becomes equal to make the speed ratio approximately 1.0. If no torque difference exists between the drive and driven pulleys, the speed ratio may become 1.0. However, if different torques are applied on the drive and driven pulleys, the speed ratio varies in accordance with the applied torques.

For example, when the drive pulley is driven by engine power, the V-belt is squeezed into the drive pulley by the applied torque. The diameter of a circle around which the V-belt is trained on the drive pulley becomes small to vary the speed ratio toward LOW-ratio. On the other hand, when the driven pulley is driven by deceleration power from the road-wheels, the V-belt is squeezed into the driven pulley. The diameter of a circle around which the V-belt is trained on the driven pulley becomes small to vary the speed ratio toward TOP-ratio.

The electric shift control means may comprise a shift control valve for generating a shift control pressure by which the shift valve is operationally controlled, a shift inhibitor valve for selectively supplying the shift control pressure and a line pressure to said shift valve, and a solenoid valve for controlling the operations of said shift inhibitor valve. The shift valve regulates the drive and driven cylinder pressures based on the shift control pressure when the shift valve receives the shift control pressure. While, the shift valve makes the drive and driven cylinder pressures equal with each other when the shift valve receives the line pressure. The shift inhibitor valve allows the supply of the shift control pressure to the shift valve when the solenoid valve is electrically turned on. While, the shift inhibitor valve allows the supply of the line pressure to the shift valve when the solenoid valve is turned off (or when an electric failure occurs).

The pressure regulator valve may include a high pressure regulator valve for generating a high pulley control pressure, a low pressure regulator valve for generating a low pulley control pressure which is lower in pressure than the high pulley control pressure, and a high/low pressure control valve for operationally controlling the high pressure regulator valve and the low pressure regulator valve. The shift valve allows the supply of the low pulley control pressure to both the drive and driven cylinders when the shift valve receives the line pressure. In this control apparatus, when there is an electrical supply failure, the line pressure is supplied to the shift valve, whereby the low pulley control pressure is supplied to both the cylinders. Accordingly, even when the electrical system fails, the low pulley control pressure which is required to prevent a belt slip but is not excessive is supplied to the pulley cylinders.

The high/low pressure control valve may include an electric valve operationally controlled by an electric drive force. When the electric power supply to the high/low pressure control valve is lost, the low pressure regulator valve generates a maximum low pulley control pressure within its regulating pressure range. The low pulley control pressure is low in pressure so as not to exert an excessive thrust force on the V-belt. However, since the maximum low pulley control pressure is used, any slippage of the V-belt is prevented even if the electric power supply is lost.

When the line pressure is supplied to the shift valve, at first, the shift valve is moved to a position at which the high pulley control pressure is supplied to the drive pulley cylinder and the low pulley control pressure is supplied to the driven pulley cylinder. Then, the shift valve is further moved to a position at which the low pulley control pressure is supplied to both the drive and driven cylinders.

When the electric supply system fails, the high and low pulley control pressures are respectively supplied to the drive and driven cylinders to shift the speed ratio toward TOP-ratio at first to prevent the speed ratio from being shifted toward LOW-ratio. Then the pressures in the drive and driven cylinders become equal for a medium speed ratio. If the speed ratio was shifted toward LOW-ratio when the electric supply failed, a deceleration shock may easily occurs, but the control apparatus can positively prevent the shift toward LOW-ratio.

The electric shift control means may include a linear solenoid valve for generating a shift control pressure supplied to the shift valve in response to a shift control current. When a normal shift control current, in which a zero-current is not included, is fed to the linear solenoid valve, a normal shift control pressure is generated by the linear solenoid valve. When the electric power supply to the linear solenoid valve is lost, a zero-current shift control pressure is generated by the linear solenoid valve. The shift valve regulates the drive and driven cylinder pressures based on the normal shift control pressure when the shift valve receives the normal shift control pressure while, the shift valve makes the drive and driven cylinder pressures equal with each other when the shift valve receives the zero-current shift control pressure.

Under a normal condition, the normal shift control pressure generated by the linear solenoid valve (the electric shift control means) is fed to the shift valve to control the speed ratio. While, under an electrically failed condition, the zero-current shift control pressure is fed to the shift valve to make both the drive and driven cylinder pressures equal with each other. Therefore, even under an electrically failed condition, a certain degree of speed ratio control can be carried out.

The pressure regulator valve may include a high pressure regulator valve for generating a high pulley control pressure, and a low pressure linear solenoid regulator valve for generating a low pulley control pressure, which is lower in pressure than the high pulley control pressure, based on the shift control current. When the electric power supply to the low pressure linear solenoid regulator valve is lost, the low pressure linear solenoid regulator valve generates a maximum low pulley control pressure within its regulating pressure range. When the zero-current shift control pressure is supplied to the shift valve, the shift valve allows the supply of the maximum low pulley control pressure to both the drive and driven cylinders.

Further, when the zero-current shift control pressure is supplied to the shift valve, the shift valve is preferably moved to a position at which the high pulley control pressure is supplied to the drive cylinder and the low pulley control pressure is supplied to the driven cylinder at first and then, the shift valve is moved to a position at which the low pulley control pressure is supplied to both the drive and driven cylinders.

DETAILED DESCRIPTION OF THE PREFERRED EMBODIMENTS

Figure 1:
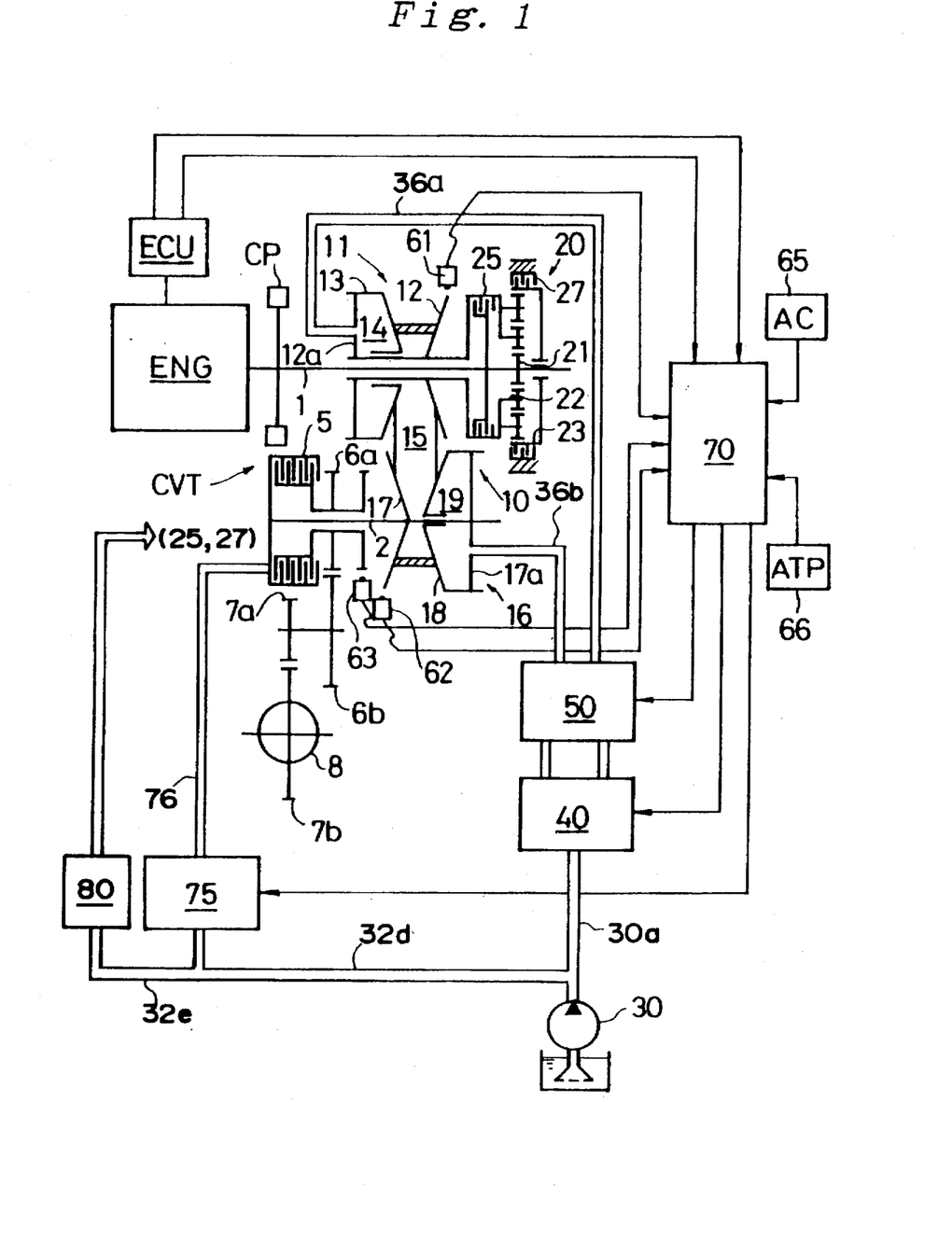
FIG. 1 is a schematic view showing in diagrammatic form a V-belt-type continuously variable transmission controlled by a control apparatus according to the present invention.

A belt-type continuously variable transmission having a control apparatus according to the present invention is schematically shown in FIG. 1. The belt-type continuously variable transmission comprises a metallic V-belt mechanism 10 disposed between an input shaft 1 and a counter shaft 2, a planetary-gear forward-reverse selector mechanism 20 disposed between the input shaft 1 and a drive pulley 11, and a starting clutch 5 disposed between the counter shaft 2 and an output member (a differential mechanism 8, for example). The transmission is suitable for use as a motor vehicle transmission. The input shaft 1 is connected with an engine output shaft through a coupling mechanism CP. The differential mechanism 8 is connected with right and left wheels (not shown).

The metallic V-belt mechanism 10 comprises the drive pulley 11 mounted on the input shaft 1, a driven pulley 16 mounted on the countershaft 2, and a metallic V-belt 15 trained around the drive and driven pulleys 11, 16.

The drive pulley 11 comprises an axially fixed pulley member 12 rotatably mounted on the input shaft 1, and a pulley member 13 axially movable relatively to the fixed pulley member 12. The pulley member 13 has a cylinder chamber 14 defined axially laterally thereof by a cylinder wall 12a coupled to the axially fixed pulley member 12. When a hydraulic pressure is supplied to the cylinder chamber 14, it generates a lateral force for moving the pulley member 13 axially toward the fixed pulley member 12.

The driven pulley 16 comprises a fixed pulley member 17 fixedly mounted on the countershaft 2, and a pulley member 18 axially movable relatively to the fixed pulley member 17. The pulley member 18 has a cylinder chamber 19 defined axially laterally thereof by a cylinder wall 17a coupled to the fixed pulley member 17. When a hydraulic pressure is supplied to the cylinder chamber 19, it generates a lateral pressure for moving the pulley member 18 axially toward the fixed pulley member 17.

Control of the hydraulic pressures (the pulley control hydraulic pressures) supplied to the cylinder chambers 14, 19 enables the control of the thrust forces applied to the V-belt 15 so as not to cause a slip thereof. The control of the pulley control hydraulic pressure also enables the control of the pulley width of the pulleys 11, 16 to change the diameters of circles around which the V-belt 15 is trained on the pulleys 11, 16 for continuously varying the speed ratio.

The planetary-gear forward-reverse selector mechanism 20 comprises a sun gear 21 coaxially coupled to the input shaft 1, a carrier 22 coupled to the fixed pulley member 12, a ring gear 23 that can be held against rotation by a reverse brake 27, and a forward clutch 25 capable of connecting the sun gear 21 and the ring gear 23 to each other. When the forward clutch 25 is engaged, the sun gear 21, the planet gears on the carrier 22, and the ring gear 23 rotates in unison with the input shaft 1, causing the drive pulley 11 to rotate in the same direction as the input shaft 1 (forward direction). When the reverse brake 27 is engaged, the ring gear 23 is held against rotation, and hence the carrier 22 is rotated in a direction opposite to the sun gear 21, so that the drive pulley 11 rotates in a direction opposite to the input shaft 1 (reverse direction).

Further, when both the forward clutch 25 and the reverse brake 27 are disengaged, no power is transmitted through the forward-reverse selector mechanism 20 to disconnect the engine ENG from the drive pulley 11.

The starting clutch 5 serves to allow the power to be transmitted from, or to prevent the power from being transmitted from, the countershaft 2 to the output member. When the starting clutch 5 is engaged, it connects the countershaft 2 to the output member, allowing the power to be transmitted from the countershaft 2 to the output member. Therefore, when the starting clutch 5 is engaged, the output power of the engine ENG is transmitted, at a speed ratio determined by the metallic V-belt mechanism 10, from the countershaft 2 through meshing gears 6a, 6b, 7a, 7b to the differential mechanism 8, from which it is divided and transmitted to the right and left wheels. When the starting clutch 5 is disengaged, no such engine output power can be transmitted, and hence the transmission is in a neutral condition.

The control apparatus for controlling the above belt-type continuously variable transmission is described hereinafter. The control apparatus comprises a group of regulator valves 40 by which a pulley control hydraulic pressures to be supplied to the drive and driven cylinder chambers 14, 19 are generated, a group of speed-ratio control valves 50 by which the supply of the pulley control hydraulic pressures to the cylinder chambers 14, 19 are controlled, a clutch control valve 75 by which the starting clutch 5 is operationally controlled, and a manual valve 80 which is operationally controlled in response to the operation of a manual shift lever (not shown).

The operations of the regulator valve group 40, the speed-ratio control valve group 50 and the clutch control valve 75 are controlled based on signals sent from a controller 70. Electric signals corresponding to the engine rotational speed and the engine intake vacuum pressure PB are sent from an engine control unit ECU to the controller 70. Electric signals corresponding to the rotational speeds of the drive pulley 11, the driven pulley 16 and the gear 6a which are respectively detected by first to third sensors 61, 62, 63 are sent to the controller 70. A detection signal from an air-conditioner sensor 65 which detects whether an air-conditioner AC is operated or not is also sent to the controller 70. Further, a shift-range position signal from a shift-range detector 66 which detects the shift-range based on the position ATP of a manual shift lever (or the position of a spool of a manual valve 80) is sent to the controller.

Figure 2:
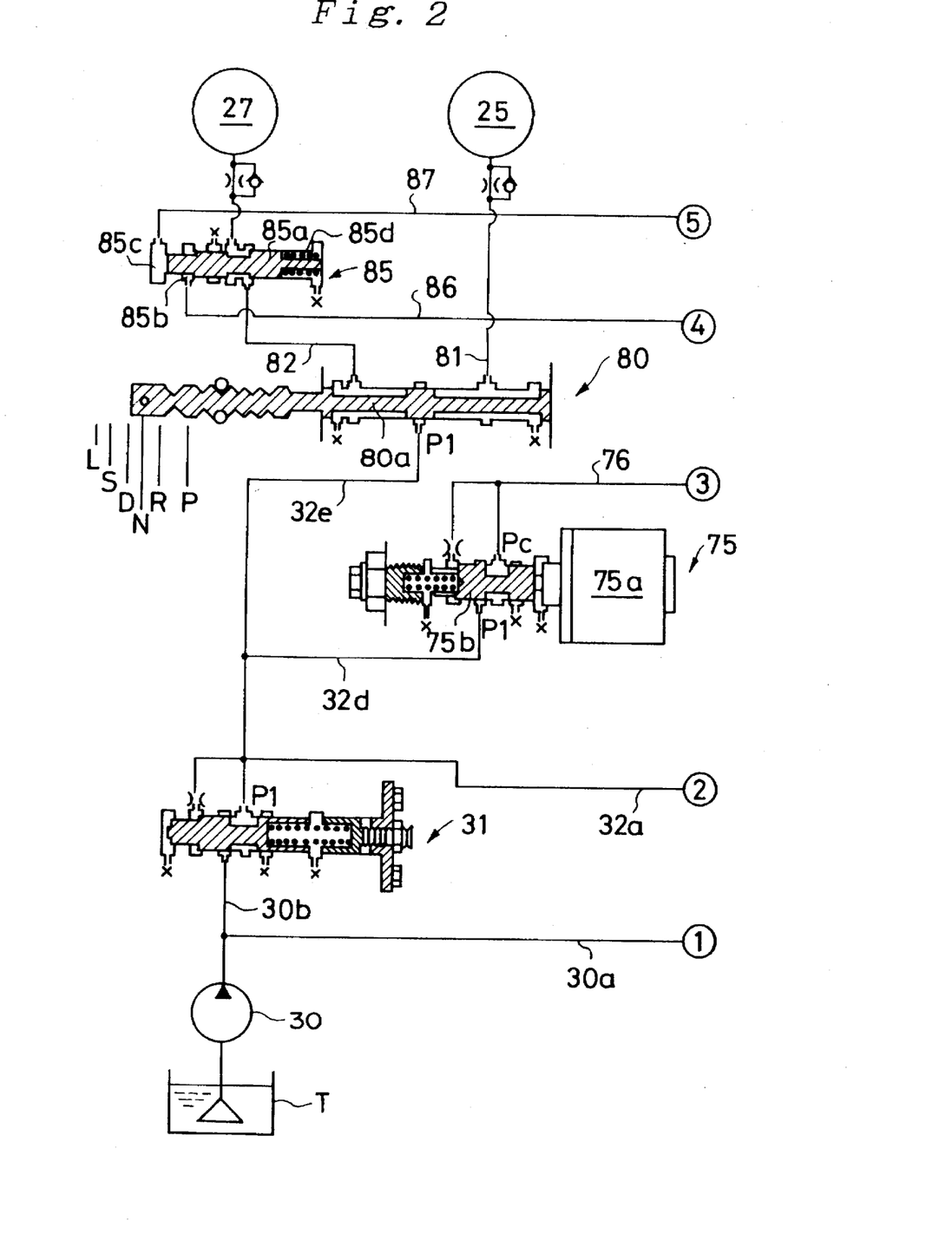
FIGS. 2 and 3 are circuit diagrams of a hydraulic circuit of the control apparatus according to a first embodiment of the present invention.
Figure 3:
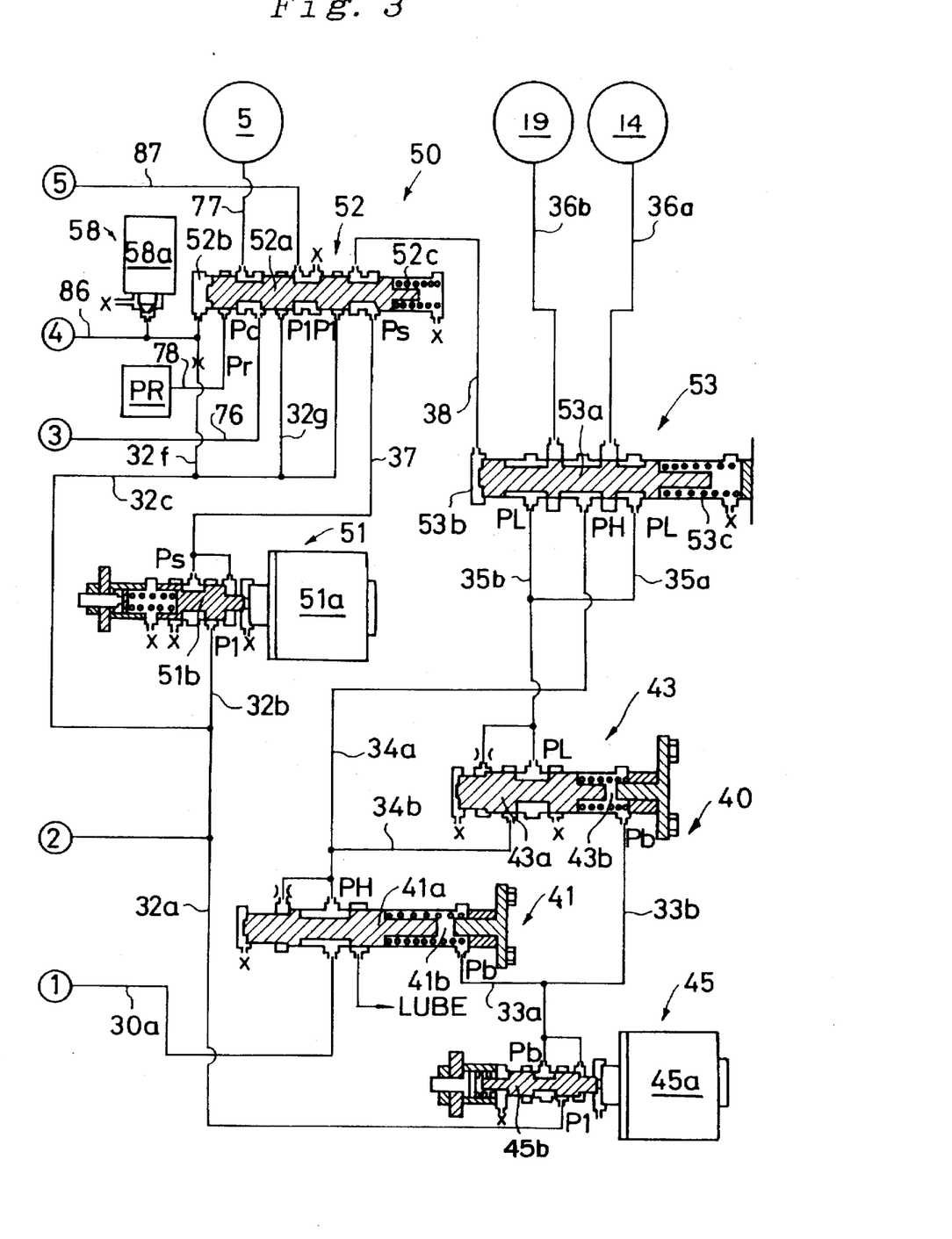

The regulator valve group 40 is described referring the hydraulic circuit diagrams shown in FIGS. 2 and 3. The hydraulic circuit arrangements shown in FIGS. 2 and 3 jointly make up a single hydraulic circuit with hydraulic passages indicated by ①  to ⑤  in FIGS. 2 and 3 being joined to each other. Further, the mark "X" indicates that the marked position is connected with a drain.

The working oil from a hydraulic pump 30 is supplied to a high pressure regulator valve 41 through a hydraulic passage 30a (①), and also supplied to a reducing valve 31 through a hydraulic passage 30b. The reducing valve 31 produces a line pressure PI having a substantially constant pressure. The working oil under the line pressure PI is supplied to a high/low pressure control valve 45, a shift control valve 51 and a shift inhibitor valve 52 through hydraulic passages 32a (②), 32b and 32c. The working oil under the line pressure PI is also supplied to the clutch control valve 75 and the manual valve 80 through hydraulic passages 32d, 32e.

The high/low pressure control valve 45 includes a linear solenoid 45a. The current control of the linear solenoid 45a allows control of a biasing force applied to a spool 45b. As a result, the line pressure PI is converted in the high/low pressure control valve 45 to a control back pressure Pb which corresponds to the biasing force. Then, the control back-pressure Pb is supplied to hydraulic passages 33a, 33b. The control back-pressure Pb is supplied to right-end chambers 41b, 43b of high and low pressure regulator valves 41, 43 to push spools 41a, 43a to the left. When a failure in the electric supply to the linear solenoid 45a occurs, the control back-pressure Pb becomes equal to the line pressure P1.

When the control back-pressure Pb is supplied to the high pressure regulator valve 41, the valve 41 regulates the hydraulic pressure of oil supplied from pump 30 through the hydraulic passage 30a in correspondence with the control back-pressure Pb, thereby converting it to a high pulley control pressure PH. When the control back-pressure Pb becomes equal to the line pressure P1, the high pulley control pressure PH increases to a maximum pressure. The high pulley control pressure PH is supplied to a shift valve 53 through a hydraulic passage 34a, and also supplied to the low pressure regulator valve 43 through a hydraulic passage 34b.

When the control back-pressure Pb is supplied to the-low pressure regulator valve 43, the valve 43 regulates the high pulley control pressure PH in correspondence with the control back-pressure Pb to convert it to a low pulley control pressure PL. Therefore, the low pulley control pressure PL is lower in pressure than the high pulley control pressure PH. When the control back-pressure Pb becomes equal to the line pressure P1, the low pulley control pressure PL increases to a maximum pressure. The low pulley control pressure PL is supplied to the shift valve 53 through hydraulic passages 35a and 35b.

The above-mentioned regulator valve group 40 comprises the high/low pressure control valve 45, the high pressure regulator valve 41 and the low pressure regulator valve 43.

The shift control valve 51 includes a linear solenoid 51a. The current control of the linear solenoid 51a allows control of a biasing force applied to a spool 51b of the shift control valve 51. As a result, the line pressure Pl is converted in the shift control valve 51 to a shift control pressure Ps which corresponds to the biasing force. Then, the shift control pressure Ps is supplied to the shift inhibitor valve 52 through a hydraulic passage 37.

In the shift inhibitor valve 52, the line pressure P1 is supplied to a left-end chamber 52b through a hydraulic passage 32f branched from the passage 32c. A spool 52a of the shift inhibitor valve 52 is pushed to the left by a spring 52c. However, when the line pressure P1 is supplied to the left-end chamber 52b, the spool 52a is moved to the right against the biasing force of the spring 52c. Then the shift control pressure Ps from the hydraulic passage 37 is supplied to a left-end chamber 53b of the shift valve 53 through a hydraulic passage 38.

The hydraulic passage 32f in which an orifice is disposed as shown in the FIG. 3 is connected to a solenoid valve 58 having a solenoid 58a. When the solenoid 58a is electrically turned on or excited, a drain port thereof is closed. When the solenoid 58a is turned off (de-excited), the drain port is opened to connect the hydraulic passage 32f to a drain port.

Accordingly, when the electric power supply is lost accidentally because of an electrical failure such as a wire disconnection (when an electrical failure occurs), the left-end hydraulic chamber 52b of the shift inhibitor valve 52 is connected to the drain port of the solenoid valve 58 to reduce the hydraulic pressure in the chamber 52b to zero. As a result, the spool 52a is moved to the left by the biasing force of the spring 52c. When the spool 52a is moved to the left, the hydraulic passage 37 is disconnected from the passage 38, and the hydraulic passage 32c is connected to the left-end hydraulic chamber 53b to supply the line pressure P1 to the chamber 53b.

As described above, in accordance with the on-off operation of the solenoid valve 58, the shift control pressure Ps or the line pressure P1 is supplied to the left-end hydraulic chamber 53b of the shift valve 53. Both the shift control pressure Ps and the line pressure P1 acts to push a spool 53a of the shift valve 53 to the right.

The shift control valve group 50 comprises the shift control valve 51, the shift inhibitor valve 52, the shift valve 53 and the solenoid valve 58.

Firstly, the operation of the shift valve 53 under a normal condition, i.e. a condition that the solenoid valve 58 is turned on without any electric failure, is described. Under this condition, the shift control pressure Ps is supplied to the left-end hydraulic chamber 53b of the shift valve 53. Since the spool 53a is being pushed to the left by a spring 53c, the spool 53a is moved to a position at which the biasing forces of the spring 53c and the hydraulic pressure in the chamber 53b balances with each other. Accordingly, the control of the shift control pressure Ps by the shift control valve 51 enables the position control of the spool 53a of the shift valve 53.

As described above, the high pulley control pressure PH is supplied to the shift valve 53 through the hydraulic passage 34a and the low pulley control pressure PL is supplied to it through the passages 35a, 35b. These high and low pulley control pressures PH, PL are distributed to the drive and driven cylinder chambers 14, 19 through hydraulic pas 36a, 36b in accordance with the position of the spool sages 53a. The position of the spool 53a is adjusted in correspondence with the shift control pressure Ps. When the shift control pressure Ps becomes equal to a first specified shift control pressure Ps1, the spool 53a is located at a neutral position.

When the spool 53a is moved rightward from the neutral position by increasing the shift control pressure Ps, the high pulley control pressure PH is supplied to the drive cylinder chamber 14 and the low pulley control pressure PL is supplied to the driven cylinder chamber 19. While, when the spool 53a is moved leftward by decreasing the shift control pressure Ps, the low pulley control pressure PL is supplied to the drive cylinder chamber 14 and the high pulley control pressure PH is supplied to the driven cylinder chamber 19. The relationships between the shift control pressure Ps, the drive cylinder pressure Pdr in the drive cylinder chamber 14 and the driven cylinder pressure Pdn in the driven cylinder chamber 19 are shown in FIG. 10.

Figure 10:
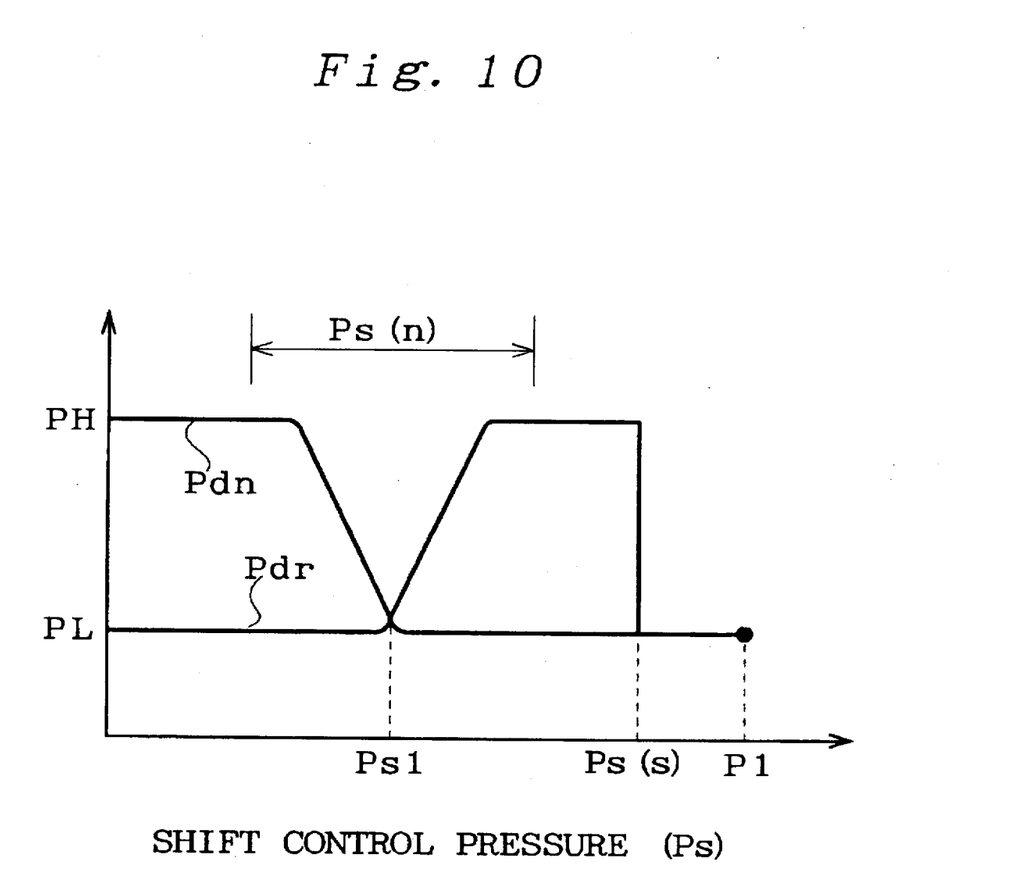
FIG. 10 is a graph showing the relationship between the shift control pressure and the pulley control pressure.

As shown in FIG. 10, the pressure control of the shift control pressure Ps to control the position of the spool 53a in the shift valve 53 allows the pressure control of the drive and driven cylinder pressures Pdr, Pdn in the drive and driven cylinder chambers 14, 19 to control the speed ratio of the transmission.

The operation of the valves under a condition that an electric supply failure occurs is now described.

When the solenoid valve 58 is turned off because of an electric failure, the line pressure P1 is supplied to the left-end hydraulic chamber 53b as described above. Though the spool 53a is pushed leftward by the spring 53c, the spool 53a is moved to the right by the biasing force caused by the line pressure P1 since the biasing force caused by the line pressure P1 is stronger than the spring biasing force.

When the spool 53a is moved rightward, the high pulley control pressure PH is supplied to the drive cylinder chamber 14 through the hydraulic passage 36a and the low pulley control pressure PL is supplied to the driven cylinder chamber 19 through the passage 36b. As a result, the pulley width of the drive pulley 11 is decreased to make the diameter of the circle, around which the V-belt 15 is trained on the drive pulley 11, bigger. Also the pulley width of the driven pulley 16 is increased to make the diameter of the circle, around which the V-belt 15 is trained on the driven pulley 16, smaller. Accordingly, when an electric failure occurs, the speed ratio is varied toward TOP-ratio to avoid an abrupt deceleration at first.

Then, when the spool 53a is further moved to the right end, the low pulley control pressure PL from the hydraulic passage 35a is supplied to the drive cylinder chamber 14 through the hydraulic passage 36a. The low pulley control pressure PL supplied from the hydraulic passage 35b is also supplied to the driven cylinder chamber 19 through the passage 36b. In other words, the low pulley control pressure PL is supplied to both the drive and driven cylinder chambers 14, 19.

When an electric system failure occurs, the electric power supply to the linear solenoid 45a of the high/low pressure control valve 45 is also lost. Accordingly, the low pulley control pressure PL increases to a maximum pressure.

As a result, when an electric supply failure occurs, the maximum low pulley control pressure PL is supplied to both the drive and driven cylinder chamber 14, 19 and the internal pressures in the cylinder chambers 14, 19 becomes equal. When the internal pressures in the cylinder chambers 14, 19 are equal with each other, it is generally considered that the pulley widths of the drive and driven pulleys 11, 16 become equal and the speed ratio becomes approximately 1.0. If the rotational torques applied on both the pulleys 11, 16 are equal, the speed ratio will become 1.0. However, if different torques are applied on the pulleys 11,16, the speed ratio varies in accordance with the applied torques.

For example, when the driven pulley 16 is driven by the engine power transmitted from the drive pulley 11, the V-belt 15 is squeezed into the drive pulley 11 (between the drive pulley members 12, 13) by the torque applied on the drive pulley 11 from the engine. The diameter of the circle, around which the V-belt 15 is trained on the drive pulley 11, becomes smaller to vary the speed ratio toward LOW-ratio. On the other hand, when the drive pulley 11 is driven by the deceleration power transmitted from the road-wheels through the driven pulley 16 during a deceleration running (or a coasting running), the V-belt 15 is squeezed into the driven pulley 16 (between the driven pulley members 17, 18) by the torque applied on the driven pulley 16 from the road-wheels. The diameter of the circle, around which the V-belt 15 is trained on the driven pulley 16, becomes smaller to vary the speed ratio toward TOP-ratio.

When the same hydraulic pressure (the same pulley control pressure) is supplied to both the cylinders 14, 19, the speed ratio can be controlled to some extent in accordance with the applied torque. In the control apparatus according to the embodiment, when an electric supply failure occurs, the common control pressure (the low pulley control pressure PL) is supplied to both the cylinders 14, 19 to ensure some degree of speed-ratio control. Further, the low pulley control pressure PL is set to be a maximum pressure under the electric supply failure condition to prevent the V-belt 15 from slipping. The maximum low pulley control pressure PL is determined so as to be high enough to prevent the belt slippage but not to be so high as to apply an excessive thrust force on the V-belt 15.

The electric current applied on a linear solenoid 75a of the clutch control valve 75 is controlled to control the pushing force applied on a spool 75b from the linear solenoid 75a in opposition to the force of a spring (unnumbered) on the left end of spool 75b. Accordingly, the line pressure P1 supplied through the hydraulic passage 32d is regulated in the clutch control valve 75 based on the pushing force to produce a clutch control pressure Pc which corresponds to the pushing force applied by the linear solenoid 75a. The clutch control pressure Pc is supplied to the shift inhibitor valve 52 through a hydraulic passage 76.

When the spool 52a of the shift inhibitor valve 52 is moved to the right (under a normal condition), the clutch control pressure Pc from the hydraulic passage 76 is supplied to the starting clutch 5 through a hydraulic passage 77. Under a normal condition, or a condition free from any electric supply failure, the engagement of the starting clutch 5 is controlled by the clutch control pressure Pc produced by the clutch control valve 75.

When the spool 52a is moved to the left under an electric supply failure condition, a hydraulic passage 78 is connected to the hydraulic passage 77. Since the passage 77 is connected to a Pitot regulator valve PR, the Pilot pressure Pr which is generated in the Pitot regulator valve PR and corresponds to the engine speed is supplied to the starting clutch 5 through the passages 77, 78. Accordingly, under an electric supply failure condition, the engagement of the starting clutch 5 is controlled by the Pitot pressure Pr.

The manual valve 80 is mechanically connected to a shift lever provided by the driver's seat via a control cable (not shown). The shift lever can be positioned at six positions P, R, N, D, S or L by the driver's manual operation. A spool 80a of the manual valve 80 is moved to any of the six positions in accordance with the operation of the shift lever. In FIG. 2, the spool 80a is located at N(neutral)-position.

The manual valve 80 controls the supply of the line pressure P1 to the forward clutch 25 and the reverse brake 27 based on the position of the spool 80a. The relationship between the position of the spool 80a and the operations of the forward clutch 25 and the reverse brake 27 is shown in Table 1 below.

TABLE 1

| SPOOL POSITION | FORWARD CLUTCH | REVERSE BRAKE |
| --- | --- | --- |
| P | OFF | OFF |
| R | OFF | ON |
| N | OFF | OFF |
| D | ON | OFF |
| S | ON | OFF |
| L | ON | OFF |

A reverse inhibitor valve 85 is disposed in a hydraulic passage 82 which connects to the reverse brake 27. The reverse inhibitor valve 85 comprises an intermediate hydraulic chamber 85b to which a hydraulic passage 86 is connected, and a left-end hydraulic chamber 85c to which a hydraulic passage 87 is connected. A spool 85a of the reverse inhibitor valve 85 is pushed leftward by a spring 85d. The hydraulic passage 86 is connected to the passage 32f(④). When the solenoid valve 58 is electrically turned on to close the drain port thereof, the line pressure P1 from the passage 32f is supplied to the intermediate hydraulic chamber 85b. Accordingly, the spool 85a of the reverse inhibitor valve 85 is moved to the right to connect the hydraulic passage 82 to the reverse brake 27. When the line pressure P1 is supplied to the reverse inhibitor valve 85 from the manual valve 80, it is supplied to the reverse brake 27 to set the reverse driving range.

When the manual valve 80 is shifted to the R(reverse)-range during running forward (running at D, S or L-range) at a speed higher than a specified speed, the solenoid valve 58 is duty-ratio controlled to supply an intermediate pressure which is lower than the line pressure P1 to the hydraulic passage 86. The intermediate pressure is so set as to be high enough to move the spool 52a of the shift inhibitor valve 52 to the right, but not enough to move the spool 85a of the reverse inhibitor valve 85 to the right. As a result, the spool 85a of the reverse inhibitor valve 85 closes the hydraulic passage 82. Accordingly, even if the manual valve 80 is shifted to the R(reverse)-range during running forward at a speed higher than the specified speed, the reverse brake 27 is not engaged until the running speed is decreased below the specified speed to protect the transmission.

Meanwhile, since the spool 52a of the shift inhibitor valve 52 is moved to the right by the intermediate pressure, the speed ratio control can be carried out.

The hydraulic passage 87 is connected to the shift inhibitor valve 52. The shift inhibitor valve 52 allows the supply of the line pressure P1 from a hydraulic passage 32g to the passage 87 only when the spool 52a is moved to the left. (When the spool 52a is moved to the right as shown in FIG. 3, the hydraulic passage 87 is connected to the drain.) The line pressure P1 supplied to the passage 87 is supplied to the left-end chamber 85c of the reverse inhibitor valve 52 to move the spool 85a to the right and to open the hydraulic passage 82. When the electric power supply to the solenoid valve 58 is accidentally lost because of an electric system failure, the spool 52a of the shift inhibitor valve 52 is moved to the right to supply the line pressure P1 to the left-end chamber 85c of the reverse inhibitor valve 85 through the hydraulic passage 87. Then the spool 85a of the reverse inhibitor valve 85 is moved to the left to open the hydraulic passage 82. Accordingly, even if an electric supply failure occurs, the line pressure P1 can be supplied to the reverse brake 27 when the manual valve 80 is shifted to the R-position. In other words, the reverse range can be positively established even under an electric supply failure condition.

As clearly described above, even if the electric power supply is lost because of an electric system failure, the engagement of the starting clutch 5 can be controlled by the Pitot pressure Pr. Further, the speed ratio can be controlled to some extent by supplying the same control pressure (the low pulley control pressure PL) to both the cylinder chambers 14, 19. Therefore, the automobile having the continuously variable transmission according to this embodiment can be smoothly controlled to run even under an electric power supply failure condition.

An another embodiment of a control apparatus for a belt-type continuously variable transmission according to the present invention will now be described by referring to the hydraulic circuit diagram shown in FIGS. 4–6. In the figures, the ends of the hydraulic passages marked by the circled alphabetical letters A to E means that the ends having the same letters are connected with each other. Further the same components or parts as those in FIGS. 2, 3 are identified by using the same numbers. Further the corresponding components or parts are identified by using the number from FIGS. 2, 3 and adding one hundred.

The control apparatus comprises a regulator valve group 140 and a shift control valve group 150. The operations of these valves are controlled based on signals sent from the controller 70.

The discharged oil from the hydraulic pump P is supplied to a high pressure regulator valve 141 through a hydraulic passage 130a. The discharged oil is also supplied to a reducing valve 131 through a hydraulic passage 130b. The line pressure P1 generated by the reducing valve 131 is supplied to a shift control valve 151 and a manual valve 180 through hydraulic passages 132a, 132b respectively.

The high pressure regulator valve 141 regulates the pressure of the oil supplied from the pump P through a passage 130a to generate a high pulley control pressure PH. Since the high pressure regulator valve 141 regulates the pressure based on a low pulley control pressure PL which is supplied through a passage 134c, the high pulley control pressure PH corresponds to the low pulley control pressure PL which is regulated by a low pressure regulator valve 143. The high pulley control pressure PH is supplied to a shift valve 153 through a hydraulic passage 134a and to the low pressure regulator valve 143 through a passage 134b.

The low pressure regulator valve 143 having a linear solenoid 143a is controlled by an electric current supplied to the linear solenoid 143a to regulate the high pulley control pressure PH and to generate the low pulley control pressure PL. When the electric current supplied to the linear solenoid 143a becomes zero, the low pulley control pressure PL is set to be maximum pressure. The low pulley control pressure PL is supplied to the shift valve 153 through hydraulic passages 135a, 135b.

The regulator valve group 140 comprises the high pressure regulator valve 141 and the low pressure regulator valve 143.

The shift control valve 151 having a linear solenoid 151a regulates the line pressure P1 supplied by a hydraulic passage 132c based on the electric current flowing through the linear solenoid 151a. The shift control valve 151 generates a shift control pressure Ps in accordance with the pushing force applied by the linear solenoid 151a. The shift control pressure Ps is supplied to a left-end chamber 153b of the shift valve 153 through a hydraulic passage 137a.

Figure 7:
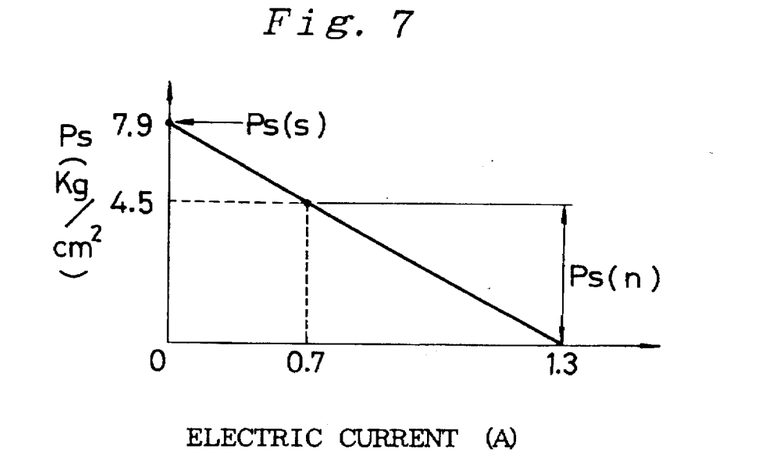
FIG. 7 is a graph showing the relationship between the electric current of a linear solenoid and the shift control pressure in a shift control valve.

The relationship between the shift control pressure Ps generated by the shift control valve 151 and the electric current (A) flowing through the linear solenoid 151a is shown in FIG. 7. In the present control apparatus, the shift control electric current flowing through the linear solenoid 151a is normally varied within a range of 0.7 A to 1.3 A to generate a normal shift control pressure Ps(n) within a range of 0 to 4.5 kg/cm$^2$. Accordingly, as long as the current flowing through the linear solenoid 151a is controlled within the range of 0.7 A to 1.3 A, the normal shift control pressure Ps(n) is supplied to the left-end chamber 153b of the shift valve 153.

Figure 4:
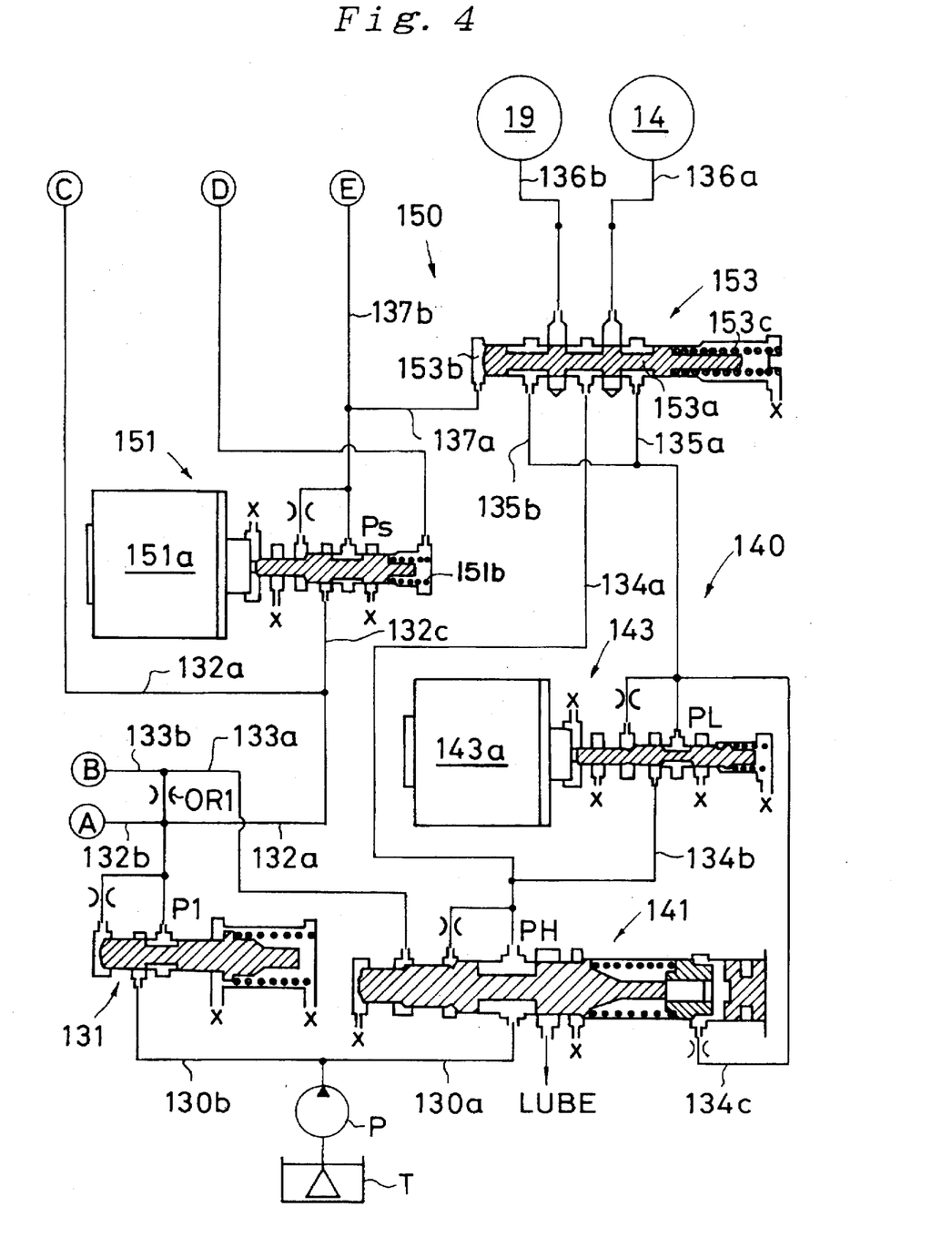
FIGS. 4, 5 and 6 are circuit diagrams of a hydraulic circuit of the control apparatus according to a second embodiment of the present invention.

As shown in FIG. 4, the shift control pressure Ps is controlled based on a biasing force of a spring 151b and a biasing force of the linear solenoid 151a. The biasing force of the spring 151b acts to increase the shift control pressure Ps and the biasing force of the linear solenoid 151a acts to decrease it.

When an electric failure occurs to discontinue the electric current flowing through the linear solenoid 151a, the biasing force of the linear solenoid 151a becomes zero. Therefore, the spring force increases the shift control pressure Ps to a pressure as high as 7.9 kg/cm$^2$ as shown in FIG. 7. The high pressure is supplied to the left-end chamber 153b of the shift valve 153 through the hydraulic passage 137a. The high pressure is referred as a zero-current shift control pressure Ps(s) hereinafter.

The shift control valve group 150 comprises the shift control valve 151 and the shift valve 153.

The operation of the shift valve 153 under a normal condition, i.e. under a condition free from any electric supply failure will now be described. Under this condition, the normal shift control pressure Ps(n) is supplied to the left-end chamber 153b of the shift valve 153. Since a spool 153a is being pushed to the left by a spring 153c, the spool 153a is moved to a position at which the biasing forces of the spring 153c and the normal shift control pressure Ps(n) balance with each other. Accordingly, the control of the normal shift control pressure Ps(n) by the shift control valve 151 enables the position control of the spool 153a of the shift valve 153.

Based on the position control of the spool 153a, the high and low pulley control pressure PH, PL can be distributed to the drive and driven cylinder chambers 14, 19. The relationship between the shift control pressure Ps, the drive cylinder pressure Pdr and the driven cylinder pressure Pdn is shown in FIG. 10.

Figure 8:
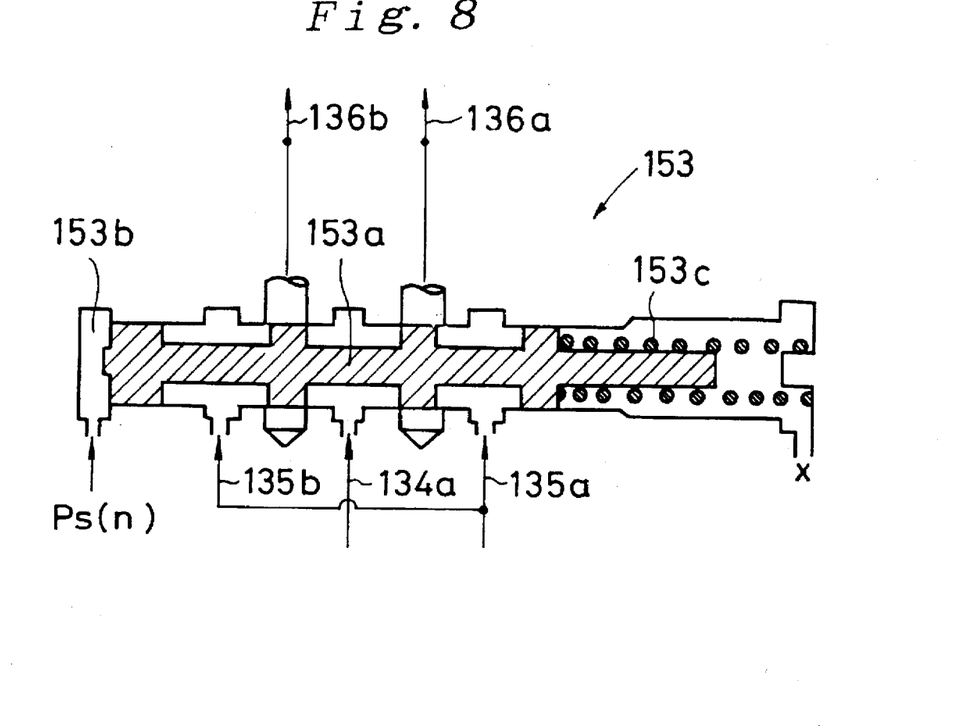
FIGS. 8 and 9 are enlarged sectional views of a shift valve.

When the normal shift control pressure Ps(n) becomes equal to a first shift control pressure Ps1, the spool 153a of the shift valve 153 is moved to a position shown in FIG. 8, at which the biasing force caused by the first shift control pressure Ps1 balances with the biasing force of the spring 153c.

When the spool 153a is moved rightward from the neutral position (the position shown in FIG. 8) by increasing the normal shift control pressure Ps(n), the hydraulic passage 134a connects to a hydraulic passage 136a and the passage 135b connects to a passage 136b. Therefore, the drive cylinder pressure Pdr in the drive cylinder chamber 14 is increased, and the driven cylinder pressure Pdn in the driven cylinder chamber 19 is decreased. As a result, the speed ratio is shifted toward TOP-ratio.

When the spool 153a is moved leftward by decreasing the normal shift control pressure Ps(n), the hydraulic passages 134a, 135a are respectively connected to the passages 136b, 136a. As a result, the driven cylinder pressure Pdn is increased and the drive cylinder pressure Pdr is decreased to shift the speed ratio toward LOW-ratio.

As described above, the pressure control of the normal shift control pressure Ps(n) to control the position of the spool 153a in the shift valve 153 allows for the pressure control of the drive and driven cylinder pressures Pdr, Pdn in the drive and driven cylinder chambers 14, 19 to control the speed ratio of the transmission.

The operation of the valves under an electrically failed condition is now described hereinafter. When electrically failed, the zero-current shift control pressure Ps(s) is supplied to the left-end chamber 153b of the shift valve 153. Since the biasing force caused by the zero-current shift control pressure Ps(s) is stronger than the biasing force of the spring 153c, the spool 153a is moved to the right as shown in FIG. 9.

When the spool 153a starts to move to the right from the neutral position shown in FIG. 8, the high pulley control pressure PH from the hydraulic passage 134a is supplied to the drive cylinder chamber 14 and the low pulley control pressure PL from the passage 135b is supplied to the driven cylinder chamber 19 at first. The pulley width of the drive pulley 11 becomes smaller and that of the driven pulley 16 becomes larger. The diameter of the circle around which the V-belt 15 is trained on the drive pulley 11 becomes larger and that on the driven pulley 16 becomes smaller. In other words, when an electric supply failure occurs to move the spool 153a to the right, the speed ratio is shifted toward TOP-ratio at first.

Figure 9:
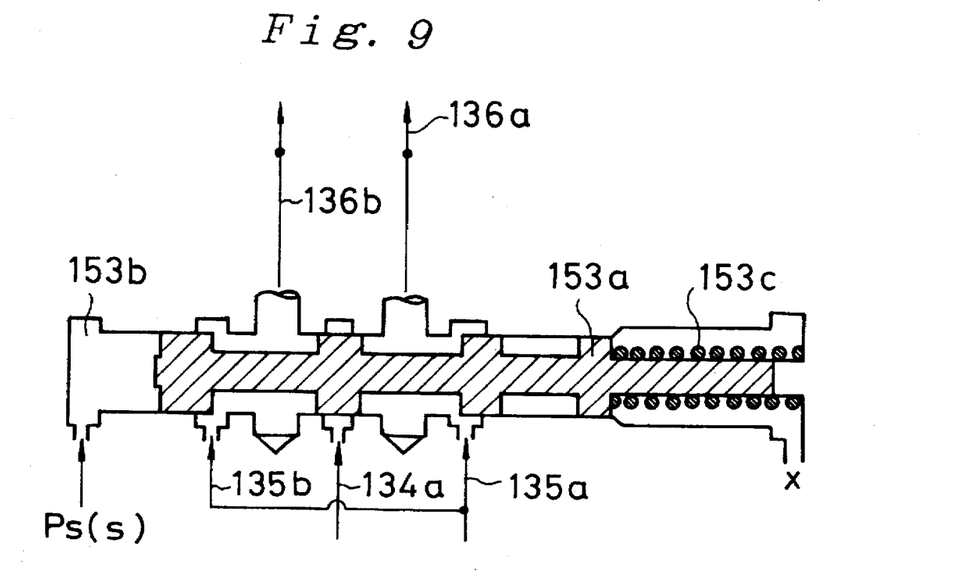

Then, when the spool 153a is moved completely to the right end as shown in FIG. 9, the low pulley control pressure PL from the passage 135a is supplied to the drive cylinder chamber 14 through the passage 136a and also the low pulley control pressure PL from the passage 135b is supplied to the driven cylinder chamber 19 through the passage 136b. Thus, the low pulley control pressure PL is supplied to both the drive and driven cylinder chambers 14, 19.

When an electric system failure occurs, the electric current through the linear solenoid 143a of the low pressure regulator valve 143 is lost too. The low pulley control pressure PL supplied from the low pressure regulator valve 143 becomes a maximum pressure within its regulating pressure range.

As described above, when an electric supply failure occurs, the maximized low pulley control pressure PL is supplied to both the drive and driven cylinder chambers 14, 19. If the drive and driven cylinder pressures Pdr, Pdn are equal to each other, the speed ratio is automatically controlled in accordance with the torque applied on the pulleys 11, 16 to ensure some degree of speed ratio control.

The electric current applied on a linear solenoid 175a provided in a clutch control valve 175 is controlled to regulate the line pressure P1 from a hydraulic passage 132d to generate a clutch control pressure Pc. The clutch control pressure Pc is supplied to a shift inhibitor valve 152.

The shift inhibitor valve 152 includes a spool 152a which is pushed rightward by a spring 152c and is pushed leftward by a hydraulic pressure supplied in a right-end hydraulic chamber 152b. The normal shift control pressure Ps(n) or the zero-current shift control pressure Ps(s) is supplied to the right-end hydraulic chamber 152b by hydraulic passage 137b. Even though the normal shift control pressure Ps(n) is supplied to the right-end hydraulic chamber 152b, the spool 152a is moved to the right because the biasing force of the spring 152c is stronger than the biasing force caused by the normal shift control pressure Ps(n). When the zero-current shift control pressure P(s) is supplied to the right-end hydraulic chamber 152b, the spool 152a is moved to the left because the biasing force caused by the zero-current shift control pressure Ps(s) is stronger than the spring force.

When the normal shift control pressure Ps(n) is supplied to the right-end hydraulic chamber 152b to keep the spool 152a moved to the right (under a normal condition), the clutch control pressure Pc supplied through a hydraulic passage 176 is supplied to the starting clutch 5 through a passage 177. Under a normal condition, i.e. a condition without any electric supply failure, the engagement of the starting clutch 5 is controlled by the clutch control pressure Pc generated by the clutch control valve 175.

When an electric power supply failure occurs, the zero-current shift control pressure Ps(s) is supplied to the right-end hydraulic chamber 152b to move the spool 152a to the left to connect a hydraulic passage 178 to the passage 177. The passage 178 is connected to a Pitot regulator valve PR in which a Pitot pressure Pr is generated in correspondence with the engine speed. The Pitot pressure Pr is supplied to the starting clutch 5. Accordingly, the engagement of the starting clutch 5 is controlled by the Pitot pressure Pr under an electrically failed condition. The Pitot regulator valve PR regulates the line pressure P1 supplied through passage 132e, 132f, 179 to generate the Pitot pressure Pr in correspondence with the engine speed.

The manual valve 180 controls the supply of the line pressure P1 to the forward clutch 25 and the reverse brake 27 based on the position of a spool 180a. The relationship between the position of the spool 180a and the operations of the forward clutch 25 and the reverse brake 27 is shown in Table 1 above.

A reverse inhibitor valve 185 is provided in a hydraulic passage 182 connected to the reverse brake 27. The reverse inhibitor valve 185 has a left-end hydraulic chamber 185b connected to a hydraulic passage 133c, a spool 185a slidably disposed therein, and a spring 185c to push the spool 185a leftward. The hydraulic passage 133c is connected to the reducing valve 131 through a hydraulic passage 133b and an orifice OR1. The line pressure P1 can be supplied to the left-end chamber 185b. A normally-closed type solenoid valve 158 is disposed in the hydraulic passage 133b. When a solenoid 158a of the solenoid valve 158 is electrically turned off (de-excited), the solenoid valve 158 is closed to allow the supply of the line pressure P1 to the left-end chamber 185b. When the solenoid 158a is turned on (excited), the passage 133b, 133c is connected to the drain through the solenoid valve 158 to reduce the pressure in the left-end chamber 158 to zero.

Figure 5:
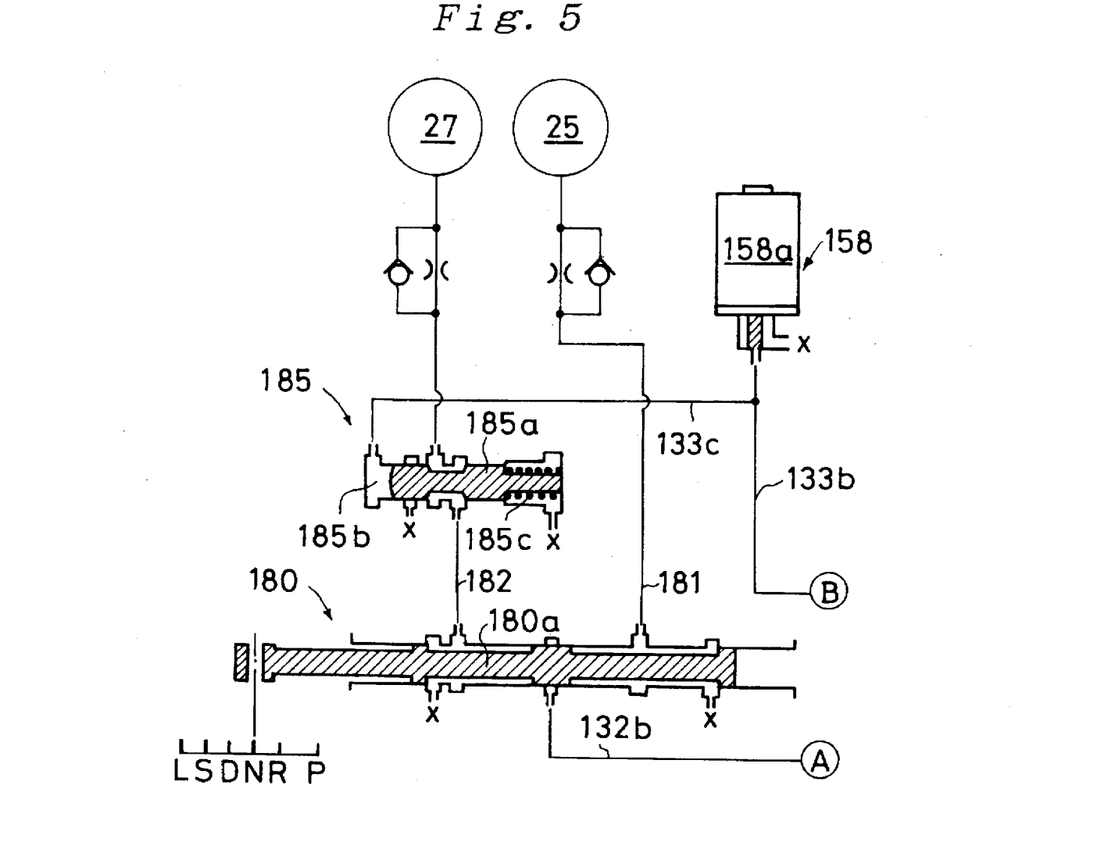
Figure 6:
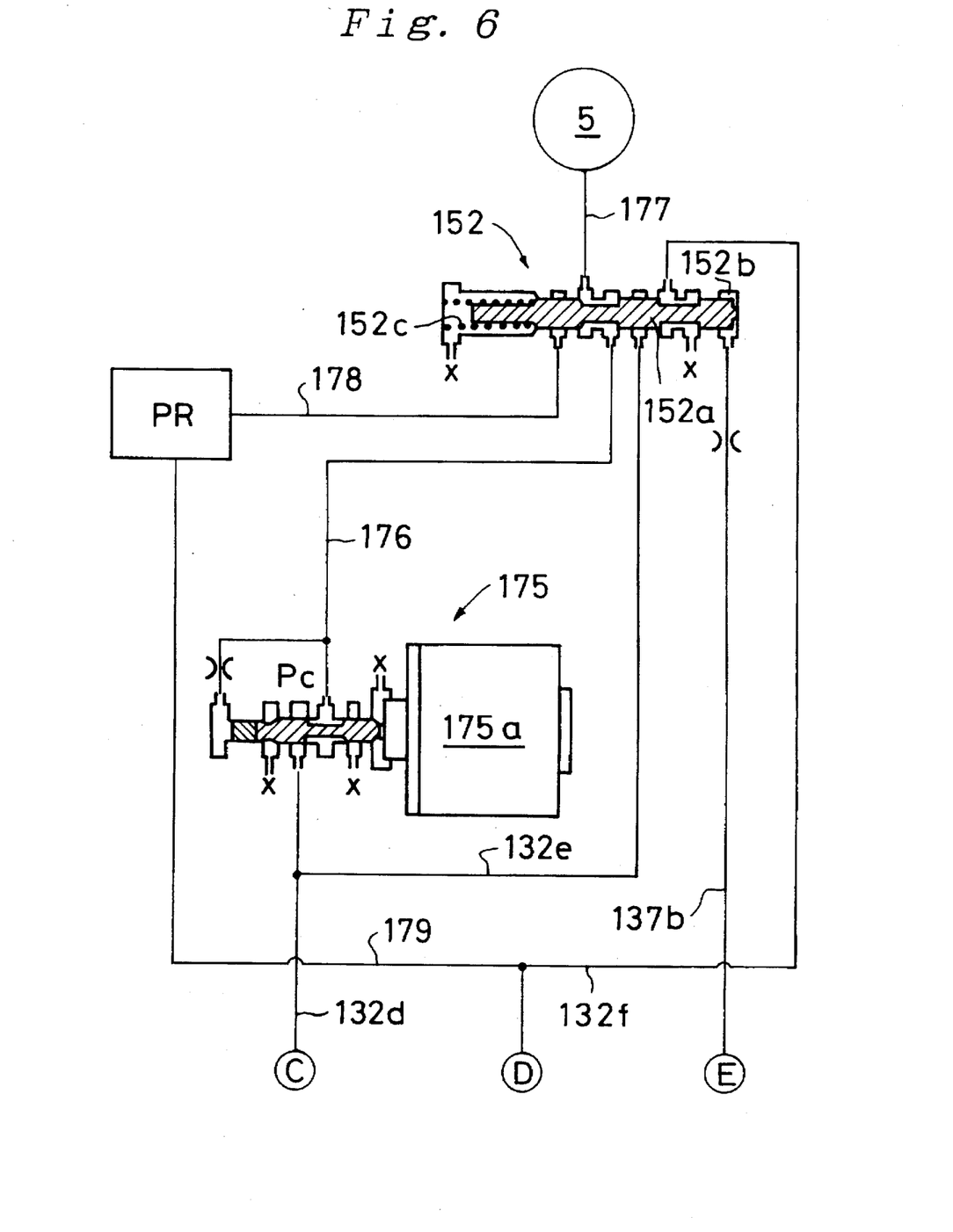

When the solenoid valve 158 is electrically turned off, the line pressure P1 is supplied to the left-end chamber 185b to move the spool 185a of the reverse inhibitor valve 185 to the right as shown in FIG. 5. The hydraulic passage 182 is connected to the reverse brake 27. Accordingly, the line pressure P1 supplied from the manual valve 180 is fed to the reverse brake 27 to establish the R(reverse)-range.

When the manual valve 180 is shifted to the R(reverse)-position during running forward (running at D, S, or L-position) at a speed higher than a specified speed, the solenoid valve 158 is turned on (excited). The spool 185a of the reverse inhibitor valve 185 is moved to the left to close the hydraulic passage 182. Accordingly, even if the manual valve 80 is shifted to the R(reverse)-position during running forward at a speed higher than the specified speed, the reverse brake 27 is not engaged until the running speed is decreased below the specified speed to protect the transmission 10.

As described above, when the solenoid valve 158 is turned off, the shift of the manual valve 180 to the R-position enables the system to establish the R-range. Accordingly, even if the solenoid valve 158 is turned off because of an electric supply failure, the R-range can be established by shifting the manual valve 180 to the R-position.

In the above embodiment, when the electric power supply to the linear solenoid 151a of the shift control valve 151 is lost because of an electric system failure, the zero-current shift control pressure Ps(s) which is higher in pressure than the normal shift control pressure Ps(n) is supplied to the left-end chamber 153b of the shift valve 133.

At the same time, the zero-current shift control pressure Ps(s) is also supplied to the right end of the shift inhibitor valve 152 through the hydraulic passage 137b. When the zero-current shift control pressure Ps(s) is supplied to the shift inhibitor valve 152, the spool 152a is moved to the left to connect the hydraulic passage 132e with the passage 132f. Then the line pressure Pl is supplied to the right end of the shift control valve 151 through these passages 132e, 132f.

As shown in FIG. 4, the line pressure Pl supplied to the right end of the shift control valve 151 generates a biasing force to push the spool of the shift control valve 151 to the left. Therefore, a high pressure (which is as high as the line pressure P1=15 kg/cm$^2$) higher than the zero-current shift control pressure Ps(s)(=7.9 kg/cm$^2$) is generated by the shift control valve 151. Namely, when the electric power supply is lost because of an electric system failure, the high pressure (as high as 15 kg/cm$^2$) is supplied to left-end chamber 153b of the shift valve 153 to positively move the spool 153a to the far right, as shown in FIG. 9.

Further, once the line pressure Pl is supplied to the right end of the shift control valve 151, the pushing force of the linear solenoid 151a cannot push the spool back to the right even if the electric power supply is restored. Namely, once an electric failure occurs to make the shift control pressure Ps generated by the shift control valve 151 as high as 15 kg/cm$^2$, the shift control pressure Ps is kept as high as 15 kg/cm$^2$ even if the electric power supply is restored, whereby a stable shift control can be ensured.

What is claimed is:

1. A control apparatus for a belt-type continuously variable transmission having a drive pulley, a driven pulley, a V-belt trained around said drive and driven pulleys, a drive cylinder for varying a pulley width of said drive pulley, and a driven cylinder for varying a pulley width of said driven pulley, comprising:

pressure regulator valve means for producing pulley control pressures to be supplied to said drive and driven cylinders;

a shift valve for distributing said pulley control pressure to said drive and driven cylinders to regulate drive and driven cylinder pressures in said drive and driven cylinders for a speed ratio control;

electric shift control means for operationally controlling said shift valve by means of an electric power; and means for allowing said electric shift control means to move said shift valve to a first position at which a common pressure is supplied to both said drive cylinder and said driven cylinder when said electric power is lost.

2. A control apparatus for a bent-type continuously variable transmission according to claim 1: wherein said electric shift control means comprises a shift control valve for generating a shift control pressure by which said shift valve is operationally controlled, a shift inhibitor valve for selectively supplying said shift control pressure and a line pressure to said shift valve, and a solenoid valve for controlling the operations of said shift inhibitor valve;

said shift valve regulates said drive and driven cylinder pressures based on said shift control pressure when said shift valve receives said shift control pressure, and said shift valve is moved to said first position to supply said common pressure to said drive and driven cylinders when said shift valve receives said line pressure; and said shift inhibitor valve allows supply of said shift control pressure to said shift valve when said solenoid valve is electrically turned on, and said shift inhibitor valve allows supply of said line pressure to said shift valve when said solenoid valve is turned off.

3. A control apparatus for a belt-type continuously variable transmission according to claim 2: wherein said pressure regulator valve includes a high pressure regulator valve for generating a high pulley control pressure, a low pressure regulator valve for generating a low pulley control pressure which is lower in pressure than said high pulley control pressure, a high/low pressure control valve for operationally controlling said high pressure regulator valve and said low pressure regulator valve; and said shift valve is moved to said first position to allow supply of said low pulley control pressure to both said drive and driven cylinders when said shift valve receives said line pressure.

4. A control apparatus for a belt-type continuously variable transmission according to claim 3: wherein when said line pressure is supplied to said shift valve, at first, said shift valve is moved to a second position at which said high pulley control pressure is supplied to said drive cylinder and said low pulley control pressure is supplied to said driven cylinder, and then, said shift valve is moved to said first position at which said low pulley control pressure is supplied to both said drive and driven cylinders.

5. A control apparatus for a belt-type continuously variable transmission according to claim 3: wherein said high/low pressure control valve includes an electric valve operationally controlled by an electric drive force; and when an electric power supply to said high/low pressure control valve is lost, said low pressure regulator valve generates a maximum low pulley control pressure within its regulating pressure range.

6. A control apparatus for a belt-type continuously variable transmission according to claim 5: wherein when said line pressure is supplied to said shift valve, at first, said shift valve is moved to a second position at which said high pulley control pressure is supplied to said drive cylinder and said low pulley control pressure is supplied to said driven cylinder, and then, said shift valve is moved to said first position at which said low pulley control pressure is supplied to both said drive and driven cylinders.

7. A control apparatus for a belt-type continuously variable transmission according to claim 1: wherein
said electric shift control means includes a linear solenoid valve for generating a shift control pressure supplied to said shift valve in response to a shift control current;
when a normal shift control current, in which a zero-current is not included, is fed to said linear solenoid valve, a normal shift control pressure is generated by said linear solenoid valve, said normal shift control pressure being held within a specified range;
when the electric power supply to said linear solenoid valve is lost, a zero-current shift control pressure is generated by said linear solenoid valve, said zero-current shift control pressure not being included in said specified range;
said shift valve regulates said drive and driven cylinder pressure based on said normal shift control pressure when said shift valve receives said normal shift control pressure; and
said shift valve is moved to said first position to supply said common pressure to said drive and driven cylinders when said shift valve receives said zero-current shift control pressure.

8. A control apparatus for a belt-type continuously variable transmission according to claim 7: wherein
said pressure regulator valve includes a high pressure regulator valve for generating a high pulley control pressure, and a low pressure linear solenoid regulator valve for generating a low pulley control pressure, which is lower in pressure than said high pulley control pressure;
when an electric power supply to said low pressure linear solenoid regulator valve is lost, said low pressure linear solenoid regulator valve generates a maximum low pulley control pressure within its regulating pressure range; and
when said zero-current shift control pressure is supplied to said shift valve, said shift valve is moved to said first position to allow supply of said maximum low pulley control pressure to both said drive and driven cylinders.

9. A control apparatus for a belt-type continuously variable transmission according to claim 8: wherein
when said zero-current shift control pressure is supplied to said shift valve,
at first, said shift valve is moved to a second position at which said high pulley control pressure is supplied to said drive cylinder and said low pulley control pressure is supplied to said driven cylinder, and
then, said shift valve is moved to said first position at which said low pulley control pressure is supplied to both said drive and driven cylinders.

10. A control apparatus for a belt-type continuously variable transmission according to claim 1: wherein
said pressure regulator valve includes a high pressure regulator valve for generating a high pulley control pressure, a low pressure regulator valve for generating a low pulley control pressure which is lower in pressure than said high pulley control pressure, a high/low pressure control valve for operationally controlling said high pressure regulator valve and said low pressure regulator valve; and
said shift valve is moved to said first position to allow supply of said low pulley control pressure to both said drive and driven cylinders when said shift valve receives a line pressure.

11. A control apparatus for a belt-type continuously variable transmission according to claim 10: wherein
said shift valve having means for moving to a second position at which said high pulley control pressure is supplied to said drive cylinder and said low pulley control pressure is supplied to said driven cylinder when said line pressure first is supplied to said shift valve, and
said shift valve then moving to said first position at which said low pulley control pressure is supplied to both said drive and driven cylinders.

12. A control apparatus for a belt-type continuously variable transmission according to claim 10: wherein
said high/low pressure control valve includes an electric valve operationally controlled by an electric drive force; and
said low pressure regulator valve generates a maximum low pulley control pressure within its regulating pressure range when an electric power supply to said high/low pressure control valve is lost.

13. A control apparatus for a belt-type continuously variable transmission according to claim 12: wherein
said shift valve having means for moving to a second position at which said high pulley control pressure is supplied to said drive cylinder and said low pulley control pressure is supplied to said driven cylinder when said line pressure first is supplied to said shift valve, and
said shift valve then moving to said first position at which said low pulley control pressure is supplied to both said drive and driven cylinders.

14. A control apparatus for a belt-type continuously variable transmission having a drive pulley, a driven pulley, a V-belt trained around said drive and driven pulleys, a drive cylinder for varying a pulley width of said drive pulley, and a driven cylinder for varying a pulley width of said driven pulley, comprising:
means for producing and supplying separate pulley control pressures to said drive cylinder and said driven cylinder;
said means being operationally controlled by an electric power control; and
said means including means for causing said pulley control pressures in both said drive cylinder and said driven cylinder to be equal when said electric power control is lost.

15. A control apparatus for a belt-type continuously variable transmission according to claim 14: wherein
said means for producing and supplying separate control pressures includes a shift control valve for generating a shift control pressure by which a shift valve is operationally controlled, a shift inhibitor valve for selectively supplying said shift control pressure and a line pressure to said shift valve, and a solenoid valve for controlling the operations of said shift inhibitor valve;
said shift valve regulates a drive cylinder pressure and driven cylinder pressure based on said shift control pressure, and said shift valve having means for causing said drive and driven cylinder pressures to be equal when said shift valve receives said line pressure; and
said shift inhibitor valve allows a supply of said shift control pressure to said shift valve when said solenoid valve is electrically turned on, and said shift inhibitor valve allows a supply of said line pressure to said shift valve when said solenoid valve is turned off.

16. A control apparatus for a belt-type continuously variable transmission according to claim 14: wherein said means for producing and supplying separate control pressures includes a high pressure regulator valve for generating a high pulley control pressure, a low pressure regulator valve for generating a low pulley control pressure which is lower in pressure than said high pulley control pressure, a high/low pressure control valve for operationally controlling said high pressure regulator valve and said low pressure regulator valve, and a shift valve for causing a supply of said low pulley control pressure to both said drive and driven cylinders when said shift valve receives a line pressure.

17. A control apparatus for a belt-type continuously variable transmission according to claim 14: wherein said means for producing and supplying separate control pressures includes a shift valve for distributing said separate control pressures to said drive and driven cylinders, said shift valve having means for moving to a position at which a high pulley control pressure is supplied to said drive cylinder and a low pulley control pressure is supplied to said driven cylinder when a line pressure first is supplied to said shift valve, and said shift valve then moving to a position at which said low pulley control pressure is supplied to both said drive and driven cylinders.

18. A control apparatus for a belt-type continuously variable transmission according to claim 16: wherein said high/low pressure control valve includes an electric valve operationally controlled by an electric drive force; and when an electric power supply to said high/low pressure control valve is lost, said low pressure regulator valve generates a maximum low pulley control pressure within its regulating pressure range.

19. A control apparatus for a belt-type continuously variable transmission according to claim 14: wherein said means for producing and supplying separate control pressures includes an electric shift control means having a linear solenoid valve for generating a shift control pressure supplied to a shift valve in response to a shift control electric current;

said linear solenoid valve generates a normal shift control pressure within a predetermined range when a normal shift control current, in which a zero-current is not included, is fed to said linear solenoid valve;

said linear solenoid valve generates a zero-current shift control pressure by said linear solenoid valve when said electric current is terminated, said zero-current shift control pressure not being included in said specified range;

said shift valve regulates said drive and driven cylinder pressures based on said normal shift control pressure when said shift valve receives said normal shift control pressure; and said shift valve having means for causing said drive and driven cylinder pressures to be equal when said shift valve receives said zero-current shift control pressure.

20. A control apparatus for a belt-type continuously variable transmission according to claim 19: wherein said pressure regulator valve includes a high pressure regulator valve for generating a high pulley control pressure, and a low pressure linear solenoid regulator valve for generating a low pulley control pressure, which is lower in pressure than said high pulley control pressure;

when an electric power supply to said low pressure linear solenoid regulator valve is lost, said low pressure linear solenoid regulator valve generates a maximum low pulley control pressure within its regulating pressure range; and when said zero-current shift control pressure is supplied to said shift valve, said shift valve allows a supply of said maximum low pulley control pressure to both said drive and driven cylinders.

21. A control apparatus for a belt-type continuously variable transmission according to claim 20: wherein said shift valve having means for moving to a position at which said high pulley control pressure is supplied to said drive cylinder and said low pulley control pressure is supplied to said driven cylinder when said zero-current shift control pressure first is supplied to said shift valve, and said shift valve then moving to a position at which said low pulley control pressure is supplied to both said drive and driven cylinders.

* * * * *

UNITED STATES PATENT AND TRADEMARK OFFICE
CERTIFICATE OF CORRECTION

PATENT NO.    : 5,665,023
DATED         : September 9, 1997
INVENTOR(S)   : Aoki et al.

It is certified that error appears in the above-identified patent and that said Letters Patent is hereby corrected as shown below:

Title page,
Under "Foreign Application Priority Data", change "Apr. 11, 1993" and substitute -- April 21, 1993 --.

Column 16,
Line 4, delete "bent-type" and replace it with -- belt-type --.

Column 17,
Line 7, delete "pressure" and insert -- pressures --.

Signed and Sealed this

Sixth Day of August, 2002

Attest:

JAMES E. ROGAN
Attesting Officer  Director of the United States Patent and Trademark Office